Dec. 6, 1927.
C. M. ALEXANDER
BAFFLE TOWER
Filed May 9, 1925
1,651,354
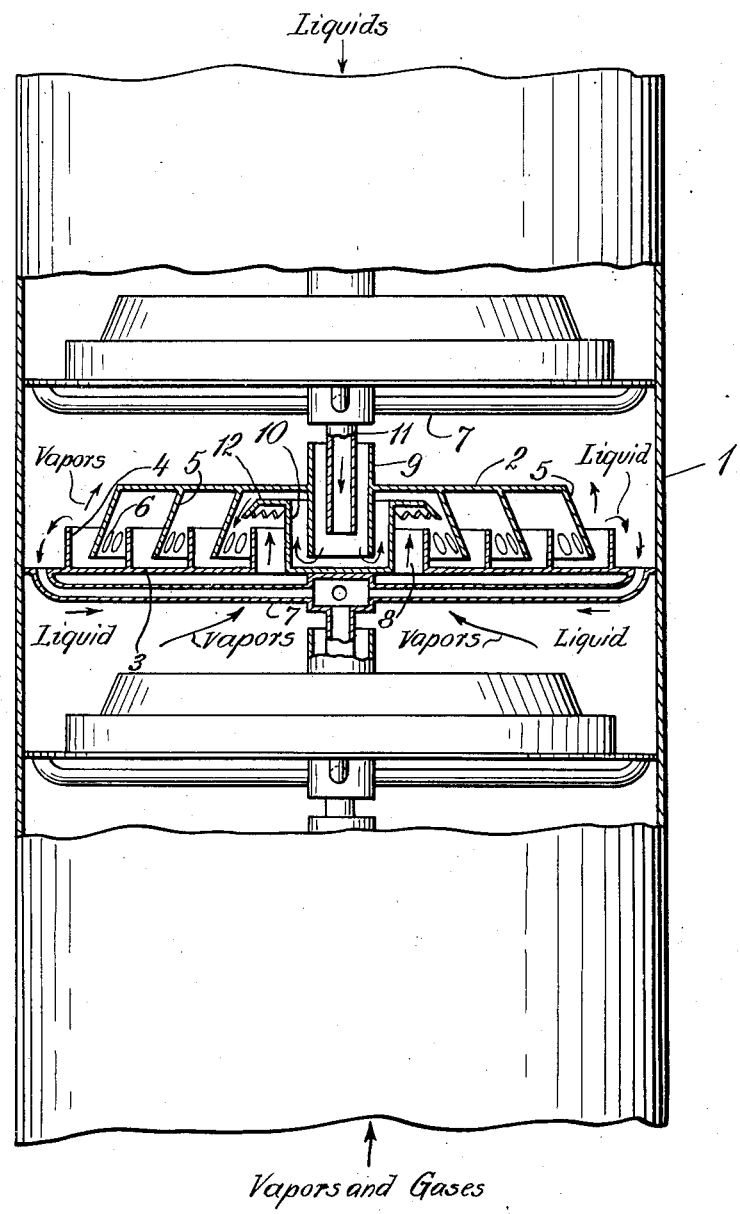
INVENTOR
Clive M. Alexander
BY
Pennie, Davis, Mar. ,— Edmonds
ATTORNEYS Patented Dec. 6, 1927.

1,651,354

UNITED STATES PATENT OFFICE.

CLIVE M. ALEXANDER, OF TULSA, OKLAHOMA.

BAFFLE TOWER.

Application filed May 9, 1925. Serial No. 29,033.

This invention relates to improvements in apparatus for effecting contact, and heat transfer, between gases and vapors and liquids. The improved apparatus of the invention is of special value and application in connection with the fractionation of hydrocarbon oils and with the scrubbing of hydrocarbon gas or gas and vapor mixtures with liquid hydrocarbons or other liquid absorbents.

It is common practice to employ fractionating towers for fractionating hydrocarbon oils, the oil vapors being passed through the tower and fractionally condensed therein, heavier constituents being condensed and lighter constituents passing through the tower uncondensed. In such operations, the efficiency and effectiveness of the fractionation are dependent, in part at least, upon the intimacy of contact as well as the time of contact between vapor and liquid constituents undergoing fractionation in the tower. Various proposals have hitherto been made for promoting the intimacy of contact and for prolonging the period of contact; for example, towers have been packed with tile or filled with irregularly arranged small tubular elements, or equipped with baffles or perforated plates, and bubble plates for causing vapors and gases to bubble through liquid constituents have been employed. Similar considerations apply in the fractionation of other materials, and similar expedients have been adopted. Likewise, in the absorption of vapors and gases in liquids, the efficiency and effectiveness of the operation are largely determined by the intimacy and period of contact, and in towers employed for such purposes like means have been used for improving the operation.

This invention relates particularly to improvements in apparatus of this general character for promoting intimacy of contact and for prolonging the period of contact, and the invention provides an improved baffle or bubble plate with this object in view. Other objects and advantages of the invention will appear as the description proceeds.

The improved baffle of the present invention is adapted for use in a generally horizontal position in baffle towers through which vapors or gas constituents pass in a generally upward direction and liquid constituents in a generally downward direction, two or more of the improved baffles being superimposed in the tower. The improved baffle comprises a pair of substantially parallel plates with members forming a plurality of troughs on each plate arranged on and between the plates and in staggered relation, the troughs on the lower plate entraining the liquid and the troughs on the upper plate directing the flow of gas or vapor through the liquid, thus providing a prolonged path between the upper and lower plates forming the baffle through which the vapor and gas and liquid constituents pass, the gas or vapor constituents being compelled to bubble at successive intervals through the liquid constituents in each baffle not once but a plurality of times. Multiple contact is thus provided in each baffle.

The improved baffle of the invention has several important advantages. The improved construction provides for positive contact between the gas and vapor and liquid constituents and prevents channelling or non-uniform flow through towers in which the improved baffle is employed. Intimate contact between gas and vapor and liquid constituents is promoted and the period of contact is prolonged. With multiple contact between gas and vapor and liquid constituents in each baffle the effectiveness of contact per baffle is improved and the number of baffles to be employed may be reduced. Among other advantages, this frequently enables a decrease in the height of the tower it is necessary to use. These advantages are important in either fractionation or absorption operations.

The invention will be further described in connection with the accompanying drawings which illustrate in a diagrammatic and conventional manner apparatus embodying the invention and adapted for operation in accordance with the invention. It is intended and will be understood that this illustration and the further more detailed description are for the purpose of exemplification and the invention is not limited thereto. The drawings illustrate a section of a tower with part of the tower wall removed exposing three baffles constructed in accordance with the invention, one of the baffles being shown in section.

Referring to the drawings, three baffles are shown arranged within the tower shell 1, each of these baffles comprising an upper plate 2 and a lower plate 3. Arranged on the lower plate are a series of members 4 in the form of concentric rings projecting upwardly toward but not reaching the upper plate and forming a plurality of ring shaped troughs on the lower plate. Arranged on the upper plate are a corresponding series of members 5 in the form of concentric rings projecting toward but not reaching the lower plate and forming a plurality of inverted troughs on the upper plate. The trough members 5 on the upper plate are positioned between the corresponding trough members on the lower plate and extend to a point between the upper edges of the adjacent trough members on the lower point. The members 5 may be provided with a series of distributing apertures 6 arranged below the level of the upper edges of the members 4 on the lower plate. Liquid connections 7 are provided for discharging liquid from the space outside the outer member 4 to lower baffles and the vapors from lower baffles enter higher baffles through the passage 8. In the form of baffle illustrated, a central trap is shown for compelling both liquid supplied to the baffle through connection 7 and vapors supplied to the baffle through passage 8 to pass through the baffle between the baffle plates. This trap comprises a well 9 extending through the upper plate to and depending into a receptacle 10, a liquid connection 11, connected to the liquid connections 7, extending into this well. A discharge member 12 is arranged about the upper end of the receptacle 10 for discharging liquid therefrom and distributing it into the first trough formed by the inner member 4 on the lower plate.

In operation, liquid constituents collect in the trough between the members 4 on the lower plate to a level determined by the height of the top edges of the members 4. As liquid is supplied to the inner trough it gradually overflows into the successive troughs toward the outer edge of the baffle and finally escapes through connection 7 to a lower baffle. Vapors and gases entering through the passage 8 first contact with the liquid sprayed therethrough by the discharge and distributing means 12 and are then compelled to pass through the liquid in each of the successive troughs on the lower plate under the members 5 on the upper plate. The distribution of the vapors and gases passing between the plates of the baffle may be promoted by providing distributing apertures in the depending trough members 5 as illustrated at 6. Intimate contact between gas and vapor and liquid constituents is thus promoted and the contact is repeated a number of times in each baffle. In the construction shown the contacting is repeated three times, but it will be apparent that a greater or lesser number of contacts could be provided in accordance with the invention. After escaping from beneath the outer member 5 on the upper plate the vapors pass upwardly and enter a higher baffle. The liquid collecting in the receptacle 10 rises to a point sufficient to overflow the discharge member 12 and thereby submerges the lower end of the well 9 preventing the escape of vapors and gases through the well 9.

In the apparatus illustrated the trough members are shown as concentric rings on the plates forming the baffle. The trough members may also be arranged in rectangular or other configuration. The baffle illustrated and particularly described is also arranged for flow of gases and vapors and liquid outwardly from the center of the baffle. The baffle may also be arranged for flowing the gases and vapors and liquid in the opposite direction.

For either fractionation or absorption operations, a series of these baffles are superimposed in a tower, the liquid connection 11 on the higher baffles being extended into the well 9 on lower baffles as shown. For absorption, the gas or gas and vapor mixture is supplied to the lower end of the tower and the absorbing menstruum is supplied to the upper end of the tower, the gas mixture passing through the tower in a direction generally countercurrent to the absorbent. While the general direction of flow is countercurrent, it will be noted that in each baffle the flow is concurrent. For fractionation, vapors and gases may similarly be supplied to the lower end of the tower and liquids may be supplied to the upper end of the tower, or where the tower is employed as a reflux tower with external cooling the liquid flowing downwardly through the tower may be the condensate produced from the vapors and gases therein.

I claim:

1. A bubble cap baffle for gas and liquid contact apparatus, comprising stationary upper and lower plates in substantially parallel relation, members on the lower plate projecting toward but not reaching the upper plate and forming a plurality of troughs on the lower plate, members on the upper plate projecting toward but not reaching the lower plate and forming a plurality of inverted troughs on the upper plate, the said members on the upper plate being arranged between the said members on the lower plate and extending to a point below the upper edges of the adjacent trough members on the lower plate, means for supplying gaseous fluids to a trough on the upper plate and means for supplying liquid to a trough on the lower plate.

2. A bubble cap baffle for gas and liquid contact apparatus, comprising a pair of substantially parallel stationary circular plates, members in the form of concentric rings on the lower plate of the pair projecting toward but not reaching the upper plate, members in the form of concentric rings on the upper plate of the pair projecting toward but not reaching the lower plate, the said members on the upper plate being arranged between the said members on the lower plate and extending to a point below the upper edges of the adjacent members on the lower plate, means for supplying gaseous fluids to the space within the inner ring member on the upper plate and means for supplying liquid to the trough on the lower plate into which the said inner ring member on the upper plate depends.

3. A bubble cap baffle for gas and liquid contact apparatus, comprising stationary upper and lower plates in substantially parallel relation, members on the lower plate projecting toward but not reaching the upper plate and forming a plurality of troughs on the lower plate, members on the upper plate projecting toward but not reaching the lower plate and forming a plurality of inverted troughs on the upper plate, the said members on the upper plate being arranged between the said members on the lower plate and extending to a point below the upper edges of adjacent trough members on the lower plate, means for supplying gaseous fluids to a trough on the upper plate, and means for supplying liquid to a trough on the lower plate, said means including a trap for preventing the escape of gaseous fluids therethrough.

4. A bubble cap baffle for gas and liquid contact apparatus, comprising stationary upper and lower plates in substantially parallel relation, members on the lower plate projecting toward but not reaching the upper plate and forming a plurality of troughs on the lower plate, members on the upper plate projecting toward but not reaching the lower plate and forming a plurality of inverted troughs on the upper plate, the said members on the upper plate being arranged between the said members on the lower plate and extending to a point below the upper edges of the adjacent trough members on the lower plate, a central well extending through the upper plate and depending into a receptacle on the lower plate, said receptacle being adapted to discharge from its upper end into the inner trough on the lower plate, means for supplying liquid to said well, and means for supplying gaseous fluids to the inner trough on the upper plate.

5. A baffle for gas and liquid contact apparatus comprising means for retaining a plurality of bodies of liquid thereon and means for flowing liquid successively through said bodies, and means for causing gaseous fluids to bubble successively through each of the plurality of liquid bodies on the baffle in the direction of liquid flow.

6. A bubble cap tower comprising a series of vertically arranged pairs of stationary baffles, means for causing gaseous fluids to pass upwardly and for permitting liquid fluids to pass downwardly therethrough, and means for causing gaseous fluids to bubble successively through a plurality of liquid seals between alternate baffles.

In testimony whereof I affix my signature.

CLIVE M. ALEXANDER.